(12) United States Patent
Amorese et al.

(10) Patent No.: US 12,492,430 B2
(45) Date of Patent: Dec. 9, 2025

(54) LIBRARY QUANTITATION AND QUALIFICATION

(71) Applicant: Nugen Technologies, Inc., San Carlos, CA (US)

(72) Inventors: Douglas A. Amorese, Los Altos, CA (US); Bin Li, Palo Alto, CA (US); Benjamin G. Schroeder, San Mateo, CA (US); Richard A. Fekete, San Mateo, CA (US)

(73) Assignee: TECAN GENOMICS, INC., Redwood City, CA (US)

( * ) Notice: Subject to any disclaimer, the term of this patent is extended or adjusted under 35 U.S.C. 154(b) by 547 days.

(21) Appl. No.: 15/485,109

(22) Filed: Apr. 11, 2017

(65) Prior Publication Data

US 2018/0291443 A1 Oct. 11, 2018

(51) Int. Cl.
| | | |
|---|---|---|
| *C12N 15/10* | (2006.01) | |
| *C12Q 1/6806* | (2018.01) | |
| *C12Q 1/6855* | (2018.01) | |
| *C12Q 1/686* | (2018.01) | |
| *C12Q 1/6874* | (2018.01) | |
| *C40B 40/06* | (2006.01) | |

(52) U.S. Cl.
CPC ....... *C12Q 1/6874* (2013.01); *C12N 15/1065* (2013.01); *C12Q 1/6806* (2013.01); *C12Q 1/6855* (2013.01); *C12Q 1/686* (2013.01); *C40B 40/06* (2013.01)

(58) Field of Classification Search
CPC .................................................. C12Q 1/6874
USPC .......................................................... 506/9
See application file for complete search history.

(56) References Cited

U.S. PATENT DOCUMENTS

| | | |
|---|---|---|
| 4,362,867 A | 12/1982 | Paddock |
| 4,458,066 A | 7/1984 | Caruthers et al. |
| 4,469,863 A | 9/1984 | Ts'o et al. |
| 4,582,877 A | 4/1986 | Fairchok et al. |
| 4,876,187 A | 10/1989 | Duck et al. |
| 4,925,065 A | 5/1990 | Golias |
| 4,935,357 A | 6/1990 | Szybalski |
| 4,942,124 A | 7/1990 | Church |
| 4,988,617 A | 1/1991 | Landegren et al. |
| 4,996,143 A | 2/1991 | Heller et al. |
| 5,011,769 A | 4/1991 | Duck et al. |
| 5,034,506 A | 7/1991 | Summerton et al. |
| 5,035,996 A | 7/1991 | Hartley |
| 5,043,272 A | 8/1991 | Hartley |
| 5,082,830 A | 1/1992 | Brakel et al. |
| 5,090,591 A | 2/1992 | Long |
| 5,130,238 A | 7/1992 | Malek et al. |
| 5,169,766 A | 12/1992 | Schuster et al. |
| 5,171,534 A | 12/1992 | Smith et al. |
| 5,194,370 A | 3/1993 | Berninger et al. |
| 5,216,141 A | 6/1993 | Benner |
| 5,234,809 A | 8/1993 | Boom et al. |
| 5,235,033 A | 8/1993 | Summerton et al. |
| 5,242,794 A | 9/1993 | Whiteley et al. |
| 5,384,242 A | 1/1995 | Oakes |
| 5,386,023 A | 1/1995 | Sanghvi et al. |
| 5,399,491 A | 3/1995 | Kacian et al. |
| 5,409,818 A | 4/1995 | Davey et al. |
| 5,418,149 A | 5/1995 | Gelfand et al. |
| 5,422,271 A | 6/1995 | Chen et al. |
| 5,427,929 A | 6/1995 | Richards et al. |
| 5,480,784 A | 1/1996 | Kacian et al. |
| 5,494,810 A | 2/1996 | Barany et al. |
| 5,508,169 A | 4/1996 | Deugau et al. |
| 5,508,178 A | 4/1996 | Rose et al. |
| 5,510,270 A | 4/1996 | Fodor et al. |
| 5,525,471 A | 6/1996 | Zeng |
| 5,545,522 A | 8/1996 | Van Gelder et al. |
| 5,554,516 A | 9/1996 | Kacian et al. |
| 5,554,517 A | 9/1996 | Davey et al. |
| 5,556,752 A | 9/1996 | Lockhart et al. |
| 5,565,340 A | 10/1996 | Chenchik et al. |
| 5,573,913 A | 11/1996 | Rosemeyer et al. |

(Continued)

FOREIGN PATENT DOCUMENTS

| | | |
|---|---|---|
| CA | 2444926 A1 | 11/2002 |
| CN | 1661102 A | 8/2005 |

(Continued)

OTHER PUBLICATIONS

Illumina Proprietary, Sequencing Library qPCR Quantification Guide; Catalog # SY-903-1010, Part # 11322363 Rev. C, Feb. 2011 (Year: 2011).*
Li et al. Nature Protocols; 2:1, p. 50-58 (2007) (Year: 2007).*
Nazarenko (Methods in Molecular Biology, vol. 335, p. 95-114 (2006)). (Year: 2006).*
Applied Biosystems by Life Technologies user guide to DNA fragment analysis by capillary electrophoresis (Year: 2014).*
Harris et al (Science 320:106-9) (Year: 2008).*

(Continued)

*Primary Examiner* — Christopher M Gross
(74) *Attorney, Agent, or Firm* — Brown Rudnick LLP; Robert B. Ruh, III

(57) ABSTRACT

Described herein are methods, compositions, and kits for library quantitation and qualification. Some embodiments relate to a method of library quantitation. For example, the method may include providing DNA fragments, amplifying the DNA fragments by polymerase chain reaction (PCR) in the presence of primers each labeled with a fluorophore. In these instances, only a predetermined number of fluorophores are attached to each DNA fragment. The method may further include detecting a fluorescent signal produced by the amplified DNA fragments and calculating a number of the amplified DNA fragments based on the detected fluorescent signal.

16 Claims, No Drawings

Specification includes a Sequence Listing.

(56) References Cited

U.S. PATENT DOCUMENTS

| | | |
|---|---|---|
| 5,578,832 A | 11/1996 | Trulson et al. |
| 5,589,339 A | 12/1996 | Hampson et al. |
| 5,602,240 A | 2/1997 | De Mesmaeker et al. |
| 5,637,684 A | 6/1997 | Cook et al. |
| 5,641,658 A | 6/1997 | Adams et al. |
| 5,644,048 A | 7/1997 | Yau |
| 5,665,549 A | 9/1997 | Pinkel et al. |
| 5,667,976 A | 9/1997 | Van Ness et al. |
| 5,667,979 A | 9/1997 | Berrens |
| 5,679,512 A | 10/1997 | Laney et al. |
| 5,681,726 A | 10/1997 | Huse et al. |
| 5,683,879 A | 11/1997 | Laney et al. |
| 5,688,648 A | 11/1997 | Mathies et al. |
| 5,705,628 A | 1/1998 | Hawkins |
| 5,708,154 A | 1/1998 | Smith et al. |
| 5,710,028 A | 1/1998 | Eyal et al. |
| 5,712,126 A | 1/1998 | Weissman et al. |
| 5,716,785 A | 2/1998 | Van Gelder et al. |
| 5,726,329 A | 3/1998 | Jones et al. |
| 5,750,341 A | 5/1998 | Macevicz |
| 5,759,822 A | 6/1998 | Chenchik et al. |
| 5,763,178 A | 6/1998 | Chirikjian et al. |
| 5,789,206 A | 8/1998 | Tavtigian et al. |
| 5,824,517 A | 10/1998 | Cleuziat et al. |
| 5,824,518 A | 10/1998 | Kacian et al. |
| 5,837,832 A | 11/1998 | Chee et al. |
| 5,876,976 A | 3/1999 | Richards et al. |
| 5,882,867 A | 3/1999 | Ullman et al. |
| 5,888,779 A | 3/1999 | Kacian et al. |
| 5,888,819 A | 3/1999 | Goelet et al. |
| 5,928,906 A * | 7/1999 | Koster ............... C12Q 1/6844 435/395 |
| 5,945,313 A | 8/1999 | Hartley et al. |
| 5,952,176 A | 9/1999 | McCarthy et al. |
| 5,958,681 A | 9/1999 | Wetmur et al. |
| 5,965,409 A | 10/1999 | Pardee et al. |
| 5,969,119 A | 10/1999 | Macevicz |
| 5,972,618 A | 10/1999 | Bloch |
| 6,004,744 A | 12/1999 | Goelet et al. |
| 6,004,745 A | 12/1999 | Arnold, Jr. et al. |
| 6,027,889 A | 2/2000 | Barany et al. |
| 6,027,923 A | 2/2000 | Wallace |
| 6,030,774 A | 2/2000 | Laney et al. |
| 6,037,152 A | 3/2000 | Richards et al. |
| 6,056,661 A | 5/2000 | Schmidt |
| 6,077,674 A | 6/2000 | Schleifer et al. |
| 6,087,103 A | 7/2000 | Burmer |
| 6,090,553 A | 7/2000 | Matson |
| 6,090,591 A | 7/2000 | Burg et al. |
| 6,107,023 A | 8/2000 | Reyes et al. |
| 6,110,709 A | 8/2000 | Ausubel et al. |
| 6,150,112 A | 11/2000 | Weissman et al. |
| 6,159,685 A | 12/2000 | Pinkel et al. |
| 6,160,105 A | 12/2000 | Cunningham et al. |
| 6,169,194 B1 | 1/2001 | Thompson et al. |
| 6,172,208 B1 | 1/2001 | Cook |
| 6,174,680 B1 | 1/2001 | Makrigiorgos |
| 6,180,338 B1 | 1/2001 | Adams |
| 6,190,865 B1 | 2/2001 | Jendrisak et al. |
| 6,194,211 B1 | 2/2001 | Richards et al. |
| 6,197,501 B1 | 3/2001 | Cremer et al. |
| 6,197,557 B1 | 3/2001 | Makarov et al. |
| 6,210,891 B1 | 4/2001 | Nyren et al. |
| 6,225,109 B1 | 5/2001 | Juncosa et al. |
| 6,225,451 B1 | 5/2001 | Ballinger et al. |
| 6,232,104 B1 | 5/2001 | Lishanski et al. |
| 6,251,639 B1 | 6/2001 | Kurn |
| 6,262,490 B1 | 7/2001 | Hsu et al. |
| 6,270,961 B1 | 8/2001 | Drmanac |
| 6,280,935 B1 | 8/2001 | Macevicz |
| 6,287,766 B1 | 9/2001 | Nolan et al. |
| 6,287,825 B1 | 9/2001 | Weissman et al. |
| 6,291,170 B1 | 9/2001 | Van Gelder et al. |
| 6,306,365 B1 | 10/2001 | Ruoslahti et al. |
| 6,306,597 B1 | 10/2001 | Macevicz |
| 6,309,843 B1 | 10/2001 | Timms |
| 6,326,142 B1 | 12/2001 | Royer |
| 6,335,167 B1 | 1/2002 | Pinkel et al. |
| 6,339,147 B1 | 1/2002 | Lukhtanov et al. |
| 6,440,705 B1 | 8/2002 | Stanton, Jr. et al. |
| 6,449,562 B1 | 9/2002 | Chandler et al. |
| 6,582,938 B1 | 6/2003 | Su et al. |
| 6,670,461 B1 | 12/2003 | Wengel et al. |
| 6,686,156 B2 | 2/2004 | Kurn |
| 6,692,918 B2 | 2/2004 | Kurn |
| 6,770,748 B2 | 8/2004 | Manishi et al. |
| 6,777,180 B1 | 8/2004 | Fisher et al. |
| 6,794,499 B2 | 9/2004 | Wengel et al. |
| 6,815,164 B2 | 11/2004 | Kurn |
| 6,815,167 B2 | 11/2004 | Crothers et al. |
| 6,825,011 B1 | 11/2004 | Romantchikov |
| 6,833,246 B2 | 12/2004 | Balasubramanian |
| 6,849,404 B2 | 2/2005 | Park et al. |
| 6,858,413 B2 | 2/2005 | Kurn |
| 6,913,884 B2 | 7/2005 | Stuelpnagel et al. |
| 6,917,726 B2 | 7/2005 | Levene et al. |
| 6,924,104 B2 | 8/2005 | Weissman et al. |
| 6,946,251 B2 | 9/2005 | Kurn |
| 7,001,724 B1 | 2/2006 | Greenfield |
| 7,033,764 B2 | 4/2006 | Korlach et al. |
| 7,048,481 B2 | 5/2006 | Sugata et al. |
| 7,052,847 B2 | 5/2006 | Korlach et al. |
| 7,056,676 B2 | 6/2006 | Korlach et al. |
| 7,056,716 B2 | 6/2006 | Potter et al. |
| 7,060,441 B2 | 6/2006 | Bourget et al. |
| 7,094,536 B2 | 8/2006 | Kurn |
| 7,115,400 B1 | 10/2006 | Adessi et al. |
| 7,170,050 B2 | 1/2007 | Turner et al. |
| 7,175,982 B1 | 2/2007 | McCarthy et al. |
| 7,176,025 B2 | 2/2007 | Kurn et al. |
| 7,189,512 B2 | 3/2007 | Porat et al. |
| 7,211,390 B2 | 5/2007 | Rothberg et al. |
| 7,232,656 B2 | 6/2007 | Balasubramanian et al. |
| 7,244,559 B2 | 7/2007 | Rothberg et al. |
| 7,244,567 B2 | 7/2007 | Chen et al. |
| 7,264,929 B2 | 9/2007 | Rothberg et al. |
| 7,273,730 B2 | 9/2007 | Du Breuil Lastrucci |
| 7,276,720 B2 | 10/2007 | Ulmer |
| 7,294,461 B2 | 11/2007 | Kurn |
| 7,300,755 B1 | 11/2007 | Petersdorf et al. |
| 7,302,146 B2 | 11/2007 | Turner et al. |
| 7,313,308 B2 | 12/2007 | Turner et al. |
| 7,315,019 B2 | 1/2008 | Turner et al. |
| 7,323,305 B2 | 1/2008 | Leamon et al. |
| 7,335,762 B2 | 2/2008 | Rothberg et al. |
| 7,351,557 B2 | 4/2008 | Kurn |
| 7,354,717 B2 | 4/2008 | Kurn |
| 7,361,466 B2 | 4/2008 | Korlach et al. |
| 7,361,468 B2 | 4/2008 | Liu et al. |
| 7,402,386 B2 | 7/2008 | Kurn et al. |
| 7,405,281 B2 | 7/2008 | Xu et al. |
| 7,414,117 B2 | 8/2008 | Saito et al. |
| 7,416,844 B2 | 8/2008 | Korlach et al. |
| 7,462,452 B2 | 12/2008 | Williams et al. |
| 7,462,468 B1 | 12/2008 | Williams et al. |
| 7,476,503 B2 | 1/2009 | Turner et al. |
| 7,476,504 B2 | 1/2009 | Turner |
| 7,491,498 B2 | 2/2009 | Lapidus et al. |
| 7,501,245 B2 | 3/2009 | Quake et al. |
| 7,579,153 B2 | 8/2009 | Brenner et al. |
| 7,704,687 B2 | 4/2010 | Wang et al. |
| 7,741,463 B2 | 6/2010 | Gormley et al. |
| 7,771,934 B2 | 8/2010 | Kurn |
| 7,771,946 B2 | 8/2010 | Kurn |
| 7,803,550 B2 | 9/2010 | Makarov et al. |
| 7,846,666 B2 | 12/2010 | Kurn |
| 7,846,733 B2 | 12/2010 | Kurn |
| 7,867,703 B2 | 1/2011 | Sampson et al. |
| 7,939,258 B2 | 5/2011 | Kurn et al. |
| 7,948,015 B2 | 5/2011 | Rothberg et al. |
| 7,985,565 B2 | 7/2011 | Mayer et al. |
| 8,017,335 B2 | 9/2011 | Smith |
| 8,034,568 B2 | 10/2011 | Kurn et al. |
| 8,053,192 B2 | 11/2011 | Bignell et al. |

(56) References Cited

U.S. PATENT DOCUMENTS

| | | |
|---|---|---|
| 8,071,311 B2 | 12/2011 | Kurn |
| 8,143,001 B2 | 3/2012 | Kurn et al. |
| 8,209,130 B1 | 6/2012 | Kennedy et al. |
| 8,334,116 B2 | 12/2012 | Kurn |
| 8,465,950 B2 | 6/2013 | Kurn et al. |
| 8,492,095 B2 | 7/2013 | Kurn |
| 8,512,956 B2 | 8/2013 | Kurn |
| 8,551,709 B2 | 10/2013 | Kurn et al. |
| 8,852,867 B2 | 10/2014 | Kurn et al. |
| 8,999,677 B1 | 4/2015 | Soldatov et al. |
| 9,175,325 B2 | 11/2015 | Kurn et al. |
| 9,175,336 B2 | 11/2015 | Soldatov et al. |
| 9,181,582 B2 | 11/2015 | Kurn |
| 9,206,418 B2 | 12/2015 | Armour |
| 9,248,076 B2 | 2/2016 | Sullivan et al. |
| 9,546,399 B2 | 1/2017 | Amorese et al. |
| 9,650,628 B2 | 5/2017 | Amorese et al. |
| 9,702,004 B2 | 7/2017 | Van Eijk et al. |
| 9,745,627 B2 | 8/2017 | Van Eijk et al. |
| 9,896,721 B2 | 2/2018 | Van Eijk et al. |
| 9,920,366 B2 | 3/2018 | Eltoukhy et al. |
| 10,036,012 B2 | 7/2018 | Amorese et al. |
| 10,102,337 B2 | 10/2018 | Scolnick et al. |
| 10,415,089 B2 | 9/2019 | Rava et al. |
| 10,457,995 B2 | 10/2019 | Talasaz |
| 10,570,451 B2 | 2/2020 | Salk et al. |
| 10,704,086 B2 | 7/2020 | Talasaz et al. |
| 10,738,364 B2 | 8/2020 | Talasaz |
| 2001/0000077 A1 | 3/2001 | Engelhardt et al. |
| 2001/0031739 A1 | 10/2001 | Dare |
| 2001/0034048 A1 | 10/2001 | Kurn |
| 2001/0041334 A1 | 11/2001 | Rashtchian et al. |
| 2002/0028447 A1 | 3/2002 | Li et al. |
| 2002/0058270 A1 | 5/2002 | Kurn |
| 2002/0115088 A1 | 8/2002 | Kurn |
| 2002/0150919 A1 | 10/2002 | Weismann et al. |
| 2002/0155451 A1 | 10/2002 | Makrigiorgos |
| 2002/0164628 A1 | 11/2002 | Kurn |
| 2002/0164634 A1 | 11/2002 | Patil et al. |
| 2002/0197611 A1 | 12/2002 | Chagovetz |
| 2002/0197639 A1 | 12/2002 | Shia et al. |
| 2003/0017591 A1 | 1/2003 | Kurn |
| 2003/0022207 A1 | 1/2003 | Balasubramanian et al. |
| 2003/0082543 A1 | 5/2003 | Su et al. |
| 2003/0087251 A1 | 5/2003 | Kurn |
| 2003/0119150 A1 | 6/2003 | Ankenbauer et al. |
| 2003/0143555 A1 | 7/2003 | Bourget et al. |
| 2003/0175780 A1 | 9/2003 | Jones |
| 2003/0180779 A1 | 9/2003 | Lofton-Day et al. |
| 2003/0186234 A1 | 10/2003 | Kurn |
| 2003/0207279 A1 | 11/2003 | Crothers et al. |
| 2003/0211616 A1 | 11/2003 | Leong |
| 2003/0215926 A1 | 11/2003 | Kurn et al. |
| 2003/0224439 A1 | 12/2003 | Lafferty et al. |
| 2003/0232348 A1 | 12/2003 | Jones et al. |
| 2004/0002371 A1 | 1/2004 | Paquin et al. |
| 2004/0005614 A1 | 1/2004 | Kurn et al. |
| 2004/0023271 A1 | 2/2004 | Kurn et al. |
| 2004/0115815 A1 | 6/2004 | Li et al. |
| 2004/0137456 A1 | 7/2004 | Yokota et al. |
| 2004/0161742 A1 | 8/2004 | Dean et al. |
| 2004/0203019 A1 | 10/2004 | Kurn |
| 2004/0203025 A1 | 10/2004 | Kurn |
| 2004/0248153 A1 | 12/2004 | Dear et al. |
| 2005/0003441 A1 | 1/2005 | Kurn |
| 2005/0014192 A1 | 1/2005 | Kurn |
| 2005/0019793 A1 | 1/2005 | Kurn et al. |
| 2005/0059048 A1 | 3/2005 | Gunderson et al. |
| 2005/0064414 A1 | 3/2005 | Hanna |
| 2005/0064456 A1 | 3/2005 | Kurn |
| 2005/0123956 A1 | 6/2005 | Blume et al. |
| 2005/0136417 A1 | 6/2005 | Cole et al. |
| 2005/0142577 A1 | 6/2005 | Jones et al. |
| 2005/0191656 A1 | 9/2005 | Drmanac et al. |
| 2005/0191682 A1 | 9/2005 | Barone et al. |
| 2005/0208538 A1 | 9/2005 | Kurn et al. |
| 2006/0008824 A1 | 1/2006 | Ronaghi et al. |
| 2006/0014182 A1 | 1/2006 | Kurn |
| 2006/0024678 A1 | 2/2006 | Buzby |
| 2006/0024711 A1 | 2/2006 | Lapidus et al. |
| 2006/0035274 A1 | 2/2006 | Dong |
| 2006/0046251 A1 | 3/2006 | Sampson et al. |
| 2006/0051789 A1 | 3/2006 | Kazakov et al. |
| 2006/0068415 A1 | 3/2006 | Jones et al. |
| 2006/0134633 A1 | 6/2006 | Chen et al. |
| 2006/0177841 A1 | 8/2006 | Wangh et al. |
| 2006/0216724 A1 | 9/2006 | Christians et al. |
| 2006/0263789 A1 | 11/2006 | Kincaid |
| 2006/0281082 A1 | 12/2006 | Zhu |
| 2006/0286566 A1 | 12/2006 | Lapidus et al. |
| 2006/0292597 A1 | 12/2006 | Shapero et al. |
| 2007/0031857 A1 | 2/2007 | Makarov et al. |
| 2007/0134128 A1 | 6/2007 | Korlach |
| 2007/0141604 A1 | 6/2007 | Gormley et al. |
| 2007/0224607 A1 | 9/2007 | Morgan et al. |
| 2007/0224613 A1 | 9/2007 | Strathmann |
| 2007/0231823 A1 | 10/2007 | McKernan et al. |
| 2007/0238122 A1 | 10/2007 | Allbritton et al. |
| 2007/0263045 A1 | 11/2007 | Okazawa |
| 2008/0038727 A1 | 2/2008 | Spier |
| 2008/0087826 A1 | 4/2008 | Harris et al. |
| 2008/0103058 A1 | 5/2008 | Siddiqi |
| 2008/0131937 A1 | 6/2008 | Schroeder |
| 2008/0160580 A1 | 7/2008 | Adessi et al. |
| 2008/0176311 A1 | 7/2008 | Kurn |
| 2008/0182300 A1 | 7/2008 | Kurn |
| 2008/0194413 A1 | 8/2008 | Albert |
| 2008/0194416 A1 | 8/2008 | Chen |
| 2008/0206764 A1 | 8/2008 | Williams et al. |
| 2008/0213770 A1 | 9/2008 | Williams et al. |
| 2008/0217246 A1 | 9/2008 | Benn et al. |
| 2008/0241831 A1 | 10/2008 | Fan et al. |
| 2008/0242560 A1 | 10/2008 | Gunderson et al. |
| 2008/0286795 A1 | 11/2008 | Kawashima et al. |
| 2009/0011959 A1 | 1/2009 | Costa et al. |
| 2009/0024331 A1 | 1/2009 | Tomaney et al. |
| 2009/0026082 A1 | 1/2009 | Rothberg et al. |
| 2009/0029385 A1 | 1/2009 | Christians et al. |
| 2009/0036663 A1 | 2/2009 | Kurn |
| 2009/0061425 A1 | 3/2009 | Lo et al. |
| 2009/0061439 A1 | 3/2009 | Buzby |
| 2009/0068645 A1 | 3/2009 | Sibson |
| 2009/0068655 A1 | 3/2009 | Williams |
| 2009/0068709 A1 | 3/2009 | Kurn et al. |
| 2009/0105081 A1 | 4/2009 | Rodesch et al. |
| 2009/0117573 A1 | 5/2009 | Fu et al. |
| 2009/0117621 A1 | 5/2009 | Boutell et al. |
| 2009/0123923 A1 | 5/2009 | Yamamoto et al. |
| 2009/0124514 A1 | 5/2009 | Fu et al. |
| 2009/0127589 A1 | 5/2009 | Rothberg et al. |
| 2009/0130721 A1 | 5/2009 | Kurn et al. |
| 2009/0203085 A1 | 8/2009 | Kurn et al. |
| 2009/0203531 A1 | 8/2009 | Kurn |
| 2009/0233802 A1 | 9/2009 | Bignell et al. |
| 2009/0233804 A1 | 9/2009 | Kurn et al. |
| 2009/0239232 A1 | 9/2009 | Kurn |
| 2009/0275486 A1 | 11/2009 | Kurn et al. |
| 2009/0280538 A1 | 11/2009 | Patel et al. |
| 2009/0298075 A1 | 12/2009 | Travers et al. |
| 2010/0015666 A1 | 1/2010 | Brenner et al. |
| 2010/0021973 A1 | 1/2010 | Makarov et al. |
| 2010/0022403 A1 | 1/2010 | Kurn et al. |
| 2010/0029511 A1 | 2/2010 | Raymond et al. |
| 2010/0069250 A1* | 3/2010 | White, III ............ C12Q 1/6851 506/4 |
| 2010/0081174 A1 | 4/2010 | Dunn |
| 2010/0105052 A1 | 4/2010 | Drmanac et al. |
| 2010/0113296 A1 | 5/2010 | Myerson |
| 2010/0129879 A1 | 5/2010 | Ach et al. |
| 2010/0137143 A1 | 6/2010 | Rothberg et al. |
| 2010/0159559 A1 | 6/2010 | Kurn et al. |
| 2010/0167954 A1 | 7/2010 | Earnshaw et al. |
| 2010/0173394 A1 | 7/2010 | Colston, Jr. et al. |
| 2010/0203597 A1 | 8/2010 | Chen et al. |

(56) References Cited

U.S. PATENT DOCUMENTS

| | | |
|---|---|---|
| 2010/0267043 A1 | 10/2010 | Braverman et al. |
| 2010/0273219 A1 | 10/2010 | May et al. |
| 2010/0311066 A1 | 12/2010 | Kurn |
| 2010/0323348 A1 | 12/2010 | Hamady et al. |
| 2011/0009276 A1 | 1/2011 | Vermaas et al. |
| 2011/0015096 A1 | 1/2011 | Chiu |
| 2011/0039732 A1 | 2/2011 | Raymond et al. |
| 2011/0104785 A1 | 5/2011 | Vaidyanathan et al. |
| 2011/0105364 A1 | 5/2011 | Kurn |
| 2011/0129827 A1 | 6/2011 | Causey et al. |
| 2011/0186466 A1 | 8/2011 | Kurowski et al. |
| 2011/0189679 A1 | 8/2011 | Kurn et al. |
| 2011/0224105 A1 | 9/2011 | Kurn et al. |
| 2011/0288780 A1 | 11/2011 | Rabinowitz et al. |
| 2011/0294132 A1 | 12/2011 | Kurn |
| 2011/0319290 A1 | 12/2011 | Raymond et al. |
| 2012/0003657 A1 | 1/2012 | Myllykangas et al. |
| 2012/0028310 A1 | 2/2012 | Kurn et al. |
| 2012/0045797 A1 | 2/2012 | Kurn et al. |
| 2012/0071331 A1 | 3/2012 | Casbon et al. |
| 2012/0074925 A1 | 3/2012 | Oliver |
| 2012/0102054 A1 | 4/2012 | Popescu et al. |
| 2012/0107811 A1 | 5/2012 | Kelso et al. |
| 2012/0122701 A1 | 5/2012 | Ryan et al. |
| 2012/0149068 A1 | 6/2012 | Kurn |
| 2012/0156728 A1 | 6/2012 | Li et al. |
| 2012/0157322 A1 | 6/2012 | Myllykangas et al. |
| 2012/0190587 A1 | 7/2012 | Kurn et al. |
| 2012/0208705 A1 | 8/2012 | Steemers et al. |
| 2012/0220479 A1 | 8/2012 | Ericsson et al. |
| 2012/0220483 A1 | 8/2012 | Kurn et al. |
| 2012/0220494 A1 | 8/2012 | Samuels et al. |
| 2012/0237943 A1 | 9/2012 | Soldatov et al. |
| 2012/0238738 A1 | 9/2012 | Hendrickson |
| 2012/0245041 A1 | 9/2012 | Brenner et al. |
| 2012/0252682 A1 | 10/2012 | Zhou et al. |
| 2012/0270212 A1 | 10/2012 | Rabinowitz et al. |
| 2012/0283145 A1 | 11/2012 | Wang |
| 2012/0289426 A1 | 11/2012 | Roos et al. |
| 2012/0309002 A1 | 12/2012 | Link |
| 2013/0005585 A1 | 1/2013 | Anderson et al. |
| 2013/0059738 A1 | 3/2013 | Leamon et al. |
| 2013/0072390 A1 | 3/2013 | Wang et al. |
| 2013/0137582 A1 | 5/2013 | Ong et al. |
| 2013/0231253 A1 | 9/2013 | Amorese et al. |
| 2014/0031240 A1 | 1/2014 | Behlke et al. |
| 2014/0038188 A1 | 2/2014 | Kurn |
| 2014/0038236 A1 | 2/2014 | Kurn et al. |
| 2014/0051585 A1 | 2/2014 | Prosen et al. |
| 2014/0065692 A1 | 3/2014 | Kurn et al. |
| 2014/0186827 A1 | 7/2014 | Pieprzyk et al. |
| 2014/0274729 A1 | 9/2014 | Kurn et al. |
| 2014/0274731 A1 | 9/2014 | Raymond et al. |
| 2014/0274738 A1 | 9/2014 | Amorese et al. |
| 2014/0303000 A1 | 10/2014 | Armour |
| 2014/0378345 A1 | 12/2014 | Hindson et al. |
| 2015/0004600 A1 | 1/2015 | Wang et al. |
| 2015/0011396 A1 | 1/2015 | Schroeder et al. |
| 2015/0017635 A1 | 1/2015 | Myllykangas et al. |
| 2015/0037790 A1 | 2/2015 | Fox et al. |
| 2015/0101595 A1 | 4/2015 | Hancock et al. |
| 2015/0133319 A1 | 5/2015 | Fu et al. |
| 2015/0284769 A1 | 10/2015 | Schroeder |
| 2015/0299767 A1 | 10/2015 | Armour et al. |
| 2015/0299784 A1 | 10/2015 | Fan et al. |
| 2015/0299812 A1 | 10/2015 | Talasaz |
| 2016/0016140 A1 | 1/2016 | Jovanovich et al. |
| 2016/0122756 A1 | 5/2016 | Armour |
| 2016/0130576 A1 | 5/2016 | Armour |
| 2016/0153039 A1 | 6/2016 | Amorese et al. |
| 2016/0203259 A1 | 7/2016 | Scolnick et al. |
| 2016/0220994 A1 | 8/2016 | Wright |
| 2016/0251711 A1 | 9/2016 | Amorese et al. |
| 2016/0265042 A1 | 9/2016 | Schroeder et al. |
| 2016/0275240 A1 | 9/2016 | Huelga et al. |
| 2016/0296930 A1 | 10/2016 | Matear et al. |
| 2016/0298182 A1 | 10/2016 | Fang et al. |
| 2017/0356053 A1 | 12/2017 | Otto et al. |
| 2018/0051277 A1* | 2/2018 | Godfrey ............. C12N 15/1065 |
| 2018/0127817 A1 | 5/2018 | Borchert et al. |
| 2018/0346977 A1 | 12/2018 | Alt et al. |

FOREIGN PATENT DOCUMENTS

| | | |
|---|---|---|
| CN | 101565746 A | 10/2009 |
| CN | 104364392 A | 2/2015 |
| CN | 105890722 A * | 8/2016 |
| EP | 0365627 B1 | 12/1993 |
| EP | 0329822 B1 | 6/1994 |
| EP | 0667393 A2 | 8/1995 |
| EP | 1071811 B1 | 3/2002 |
| EP | 0843735 B1 | 7/2002 |
| EP | 2272976 A1 | 1/2011 |
| EP | 2322612 A1 | 5/2011 |
| EP | 2451973 A1 | 5/2012 |
| EP | 2511381 A1 | 10/2012 |
| EP | 2599879 A1 | 6/2013 |
| EP | 1929039 B2 | 11/2013 |
| JP | 2015511819 A | 4/2015 |
| WO | 89/09284 A1 | 10/1989 |
| WO | 92/07951 A1 | 5/1992 |
| WO | 93/18052 A1 | 9/1993 |
| WO | 94/16090 A1 | 7/1994 |
| WO | 96/40998 A1 | 12/1996 |
| WO | 97/12061 A1 | 4/1997 |
| WO | 97/25416 A2 | 7/1997 |
| WO | 98/06736 A1 | 2/1998 |
| WO | 98/38296 A1 | 9/1998 |
| WO | 98/044151 A1 | 10/1998 |
| WO | 99/10540 A1 | 3/1999 |
| WO | 99/11819 A1 | 3/1999 |
| WO | 99/42618 A1 | 8/1999 |
| WO | 00/08208 A2 | 2/2000 |
| WO | 2000/09756 A1 | 2/2000 |
| WO | 00/018957 A1 | 4/2000 |
| WO | 00/39345 A1 | 7/2000 |
| WO | 2000/043531 A2 | 7/2000 |
| WO | 00/52191 A1 | 9/2000 |
| WO | 2000/55364 A2 | 9/2000 |
| WO | 00/70039 A1 | 11/2000 |
| WO | 01/20035 A2 | 3/2001 |
| WO | 01/23613 A1 | 4/2001 |
| WO | 01/46464 A1 | 6/2001 |
| WO | 01/57248 A2 | 8/2001 |
| WO | 01/64952 A2 | 9/2001 |
| WO | 02/00938 A2 | 1/2002 |
| WO | 02/28876 A2 | 4/2002 |
| WO | 02/29117 A2 | 4/2002 |
| WO | 02/36821 A2 | 5/2002 |
| WO | 02/48402 A2 | 6/2002 |
| WO | 02/060318 A2 | 8/2002 |
| WO | 02/072772 A2 | 9/2002 |
| WO | 02/072773 A2 | 9/2002 |
| WO | 02/081753 A1 | 10/2002 |
| WO | 02/090584 A2 | 11/2002 |
| WO | 03/004690 A2 | 1/2003 |
| WO | 2003/002736 A2 | 1/2003 |
| WO | 2003/012118 A1 | 2/2003 |
| WO | 03/027259 A2 | 4/2003 |
| WO | 03/078645 A2 | 9/2003 |
| WO | 03/083435 A2 | 10/2003 |
| WO | 03/106642 A2 | 12/2003 |
| WO | 04/011665 A2 | 2/2004 |
| WO | 2004/070007 A2 | 8/2004 |
| WO | 2004/092418 A2 | 10/2004 |
| WO | 2005/003375 A2 | 1/2005 |
| WO | 2005/003381 A1 | 1/2005 |
| WO | 2005/038427 A2 | 4/2005 |
| WO | 2005/065321 A2 | 7/2005 |
| WO | 2006/081222 A2 | 8/2006 |
| WO | 2006/086668 A2 | 8/2006 |
| WO | 2006/137733 A1 | 12/2006 |
| WO | 2007/018601 A1 | 2/2007 |
| WO | 2007/019444 A2 | 2/2007 |

(56) References Cited

FOREIGN PATENT DOCUMENTS

| | | |
|---|---|---|
| WO | 2007/030759 A2 | 3/2007 |
| WO | 2007/037678 A2 | 4/2007 |
| WO | 2007/052006 A1 | 5/2007 |
| WO | 2007/057652 A1 | 5/2007 |
| WO | 2007/073165 A1 | 6/2007 |
| WO | 2007/136717 A1 | 11/2007 |
| WO | 2008/005459 A2 | 1/2008 |
| WO | 2008/015396 A2 | 2/2008 |
| WO | 2008/033442 A2 | 3/2008 |
| WO | 2008/093098 A2 | 8/2008 |
| WO | 2008/115185 A2 | 9/2008 |
| WO | 2008150432 A1 | 12/2008 |
| WO | 2009/053039 A1 | 4/2009 |
| WO | 2009/102878 A2 | 8/2009 |
| WO | 2009/102896 A2 | 8/2009 |
| WO | 2009/112844 A1 | 9/2009 |
| WO | 2009/117698 A2 | 9/2009 |
| WO | 2009/120372 A2 | 10/2009 |
| WO | 2009/120374 A2 | 10/2009 |
| WO | 2010/003153 A2 | 1/2010 |
| WO | 2010/030683 A1 | 3/2010 |
| WO | 2010/039991 A2 | 4/2010 |
| WO | 2010/063711 A1 | 6/2010 |
| WO | 2010/064893 A1 | 6/2010 |
| WO | 2010/085715 A1 | 7/2010 |
| WO | 2010/091246 A2 | 8/2010 |
| WO | 2010/115154 A1 | 10/2010 |
| WO | 2010/129937 A2 | 11/2010 |
| WO | 2011/003630 A1 | 1/2011 |
| WO | 2011/009941 A1 | 1/2011 |
| WO | 2011/019964 A1 | 2/2011 |
| WO | 2011/032053 A1 | 3/2011 |
| WO | 2011032040 A1 | 3/2011 |
| WO | 2011/053987 A1 | 5/2011 |
| WO | 2011/151777 A1 | 12/2011 |
| WO | 2011/156529 A2 | 12/2011 |
| WO | 2012/013932 A1 | 2/2012 |
| WO | 2012/061832 A1 | 5/2012 |
| WO | 2012/054873 A3 | 8/2012 |
| WO | 2012/103154 A1 | 8/2012 |
| WO | 2013/059740 A1 | 4/2013 |
| WO | 2013/059746 A1 | 4/2013 |
| WO | 2013/112923 A1 | 8/2013 |
| WO | 2013/130674 A1 | 9/2013 |
| WO | 2013/130512 A3 | 10/2013 |
| WO | 2013/177220 A1 | 11/2013 |
| WO | 2013/190441 A2 | 12/2013 |
| WO | 2013/191775 A2 | 12/2013 |
| WO | 2014/028778 A1 | 2/2014 |
| WO | 2014/039556 A1 | 3/2014 |
| WO | 2014/082032 A1 | 5/2014 |
| WO | 2013/138510 A9 | 7/2014 |
| WO | 2014/144092 A1 | 9/2014 |
| WO | 2014/150931 A1 | 9/2014 |
| WO | 2015/031691 A1 | 3/2015 |
| WO | 2015/073711 A1 | 5/2015 |
| WO | 2015/104302 A1 | 7/2015 |
| WO | 2015/131107 A1 | 9/2015 |
| WO | WO-2017013103 A1 * | 1/2017 ............... B01L 7/52 |

OTHER PUBLICATIONS

Bellos, 2014, cnvCapSeq: detecting copy number variation in long-range targeted resequencing data, Nucleic Acids Res 42(20):e158.
Benson, 2013, Genbank, Nucl Acids Res 41:D36-D42.
Blomquist, 2013, Targeted RNA-Sequencing with Competitive Multiplex-PCR Amplicon Libraries, Plos One 8(11): e79120.
Bodi, 2013, Comparison of commercially available target enrichment methods for next-generation sequencing, J Biomolecular Tech 24:73-86.
Eminaga, 2013, Quantification of microRNA Expression with Next-Generation Sequencing, Unit 4.17 in Current Protocols in Molecular Biology, Wiley, New York, NY (14 pages).
Grothues, 1993, PCR amplification of megabase DNA with tagged random primers (T-PCR), Nucl Acids Res 21:1321-1322.
Illumina, 2011, TruSeq RNA and DNA Sample Preparation Kits v2, 1-15 Illumina, dated Apr. 27, 27, 2011 (4 pages).
International Search Report and Written Opinion mailed Jan. 6, 2016, for PCT/US15/44065, filed Aug. 6, 2015 (21 pages).
International Search Report and Written Opinion mailed Jul. 10, 2017, for Application No. PCT/US17/27060, filed Apr. 11, 2017 (9 pages).
International Search Report and Written Opinion mailed Mar. 5, 2015, in international patent application PCT/US2014/065530, filed Nov. 13, 2014 (12 pages).
Jiang, 2015, CODEX: a normalization and copy number variation detection method for whole exome sequencing, Nucleic Acids Res 43(6):e39.
Krumm, 2012, Copy numbervariation detection and genotyping from exome sequence data, Genome Res 22 (8):1525-1532.
Langmead, 2009, Ultrafast and memory-efficient alignment of short DNA sequences to the human genome, Genome Biol 10:R25.
Li, 2012, CONTRA: copy number analysis for targeted resequencing, Bioinformatics 28(10):1307-1313.
Liu, 2008, Sequence space coverage, entropy of genomes and the potential to detect non-human DNA in human samples, BMC Genomics 9(509):1-17.
Ma, 2015, Quantitative Analysis of Copy number Variants Based on Real-Time LightCycler PCR, Curr Protoc Hum Genet 80:7.21.1-7.23.8.
Machine translation generated on Mar. 7, 2018, of CN 105890722 by website of European Patent Office (4 pages).
Margulies, 2005, Genorne sequencing in open microfabricated high density picoliter reactors, Nature 437 (7057):376-380.
McCloskey, 2007, Encoding PCR products with batch-stamps and barcodes, Biochem Genet 45:761-767.
Myers, 2013, Protocol for Creating Multiplexed miRNA Libraries for Use in Illumina Sequencing, Myers lab microRNA-seq Protocol, Hudson Alpha Institute for Biotechnology web site, dated May 2, 2013, (15 pages).
NuGEN, 2014, User Guide Ovation Target Enrichment System, NuGEN Technologies Inc., San Carlos, CA (45 pages).
Plagnol, 2012, A robust model for read count data in exome sequencing experiments and implications for copy numbr variant calling, Bioinformatics 28(21):2747-2754.
Querfurth, 2012, Creation and application of immortalized bait libraries for targeted enrichment and next-generation sequencing, Biotechniques 52(6):375-380.
Sathirapongsasuti, 2011, Exome sequencing-based copy-number variation and loss of heterozygosity detection: ExomeCNV, Bioinformatics 27(19):2648-2654.
Schiemer, 2011, Illumina TruSeq Adapters Demystified, Tufts University Core Facility XP055357867 (5 bages).
Soni, 2007, Progress toward ultrafast DNA sequencing using solid-state nanopores, Clin Chem 53(11):1996-2001.
Staroscik, 2004, Calculator for determining the number of copies of a template, URI Genomics, webpage archive dated Apr. 6, 2017 (1 page), Retreived from the internet on Mar. 7, 2018, from <https://web.archive.org/web/20170406174850/http://cels.uri.edu/gsc/cndna.html>.
Stratagene, 1998, Gene characterization kits, Stratagene Catalog, p. 39 (2 pages).
Supplementary European search report and opinion mailed Jan. 30, 2018, for European patent application No. 15830393.3 (6 pages).
Trapnell, 2010, Transcript assembly and quantification by RNA-Seq reveals unannotated transcripts and isoform switching during cell differentiation, Nat Biotech 28:511-515.
Trapnell, 2013, Differential analysis of gene regulation at transcript resolution with RNA-seq, Nat Biotech 31:46-53.
Walker, 1992, Strand displacement amplification-an isothermal, in vitro DNA amplification technique, Nucl Acids Res 20(7):1691-1696.
Westin 2000, Anchored multiplex amplification on a microelectronic chip array, Nat Biotech 18:199-204.
Xi, 2011, Copy number variation detection in whole-genome sequencing data using the Bayesian information criterion, PNAS 108(46):e1128-e1136.

(56) References Cited

OTHER PUBLICATIONS

Extended European Search Report issued in European Application No. 17905299.8, date of mailing: Oct. 19, 2020, 7 pages.
Unemo, 2004, Molecular typing of Neisseria gonorrhoeae isolates by pyrosequencing of highly polymorphic segments of the porB gene, J Clin Microb 42(7):2926-2934.
Van der Auwera, 2013, From FastQ data to high confidence variant calls, the Genome Analysis Toolkit Best Practices Pipeline, Current Protocols in Bioinformatics 11.10.1-11.10.33, WileyOnlineLibrary.com, 33 pages.
Vigal, 2002, A review on SNP and other types of molecular markers and their use in animal genetics, Genet Sel Evol 34:275-305.
Wagle, 2012, High-Throughput detection of actionable genomic alterations in clinical tumor samples by targeted massively parallel sequencing, Cancer Discovery, 2(1):82-93.
Wienholds, 2004, Target-selected gene inactivation in zebrafish, Meth Cell Biol 77:69-90.
Wolford, 2000, High-throughput SNP detection by using DNA pooling and denaturing high performance liquid chromatography (DHPLC), Hum Genet 107:483-487.
Xu, 2012, FastUniq: A fast de novo duplicates removal tool for paired short reads, PLoSOne 7(12):e52249.
Amos, 2000, DNA pooling in mutation detection with reference to sequence analysis, Am J Hum Genet 66:1689-1692.
Applied Biosystems, 2010, BigDye Terminator v3.1 Cycle Sequencing Kit Protocol (72 pages).
Baldwin, 2009, Multilocus sequence typing of Cronobacter sakazakii and Cronobacter malonaticus reveals stable clonal structures with clinical significance which do not correlate with biotypes, BMC Microbiol 9(223):1-9.
Bao, 2014, Review of current methods, applications and data management for the bioinformatics analysis of whole exome sequencing, Cancer Informatics 13:S2, pp. 67-82.
Borodina, 2011, A strand-specific library preparation protocol for RNA sequencing methods, Meth Enzymol 500:79-98.
Browning, 2011, Haplotype phasing: existing methods and new developments, Nature Rev Gen, 12(10):703-714.
Callow, 2004, Selective DNA amplification from complex genomes using universal double-sided adaptors, Nucl Acids Res 32(2):e21/1-6.
Church, 1988, Multiplexed DNA sequencing, Science 240:185-188.
Colbert, 2001, High-throughput screening for induced point mutations, Plant Physiol 126:480-484.
Collard, 2005, An introduction to markers, quantitative trait loci (QTL) mapping and marker-assisted selection for crop improvements: the basic concepts Euphytica 142:169-196.
Diao, 2015, Building highly-optimized, low latency pipelines for genomic data analysis, 7th Bienniel Conference on Innovative Data Systems Research (CIDR'15), Jan. 4-7, Asilomar, California, USA, 12 pages.
Faircloth, 2012, Not all sequence tags are created equal: Designing and validating sequence identification tags robust to indels, PLoSONE 7(8):e42543.
Fakhrai-Rad, 2002, Pyroseqeuncing: An accurate detection platform for single nucleotide polymorphisms, Human Mutation 19:479-485.
Frederico, 1990, A sensitive genetic assay for the detection of cytosine deamination: determination of rate constants and the activation energy, Biochemistry 29(10):2532-2537.
Fromer, 2014, Using XHMM Software to Detect Copy Number Variation in Whole-Exome Sequencing Data, Curr Protoc Hum Genet 81(7.23):1-21.
Fu, 2014, Molecular indexing enables quantitative targeted RNA sequencing and reveals poor efficiencies in standard library preparations, PNAS 111(5):1891-1896 and Supporting Information, 8 pages.
Genereux, 2008, Errors in the bisulfite conversion of DNA: modulating inappropriate and failed conversion frequencies, Nucl Acids Res 36(22):e150.

Gonzales-Beltran, 2015, From Peer-REviewed to Peer-reproduced in scholary publishing: the complementary roles of data models and workflows in Bioinformatics, Plos One 10(7):127612, 23 pages.
Hajibabaei, 2005, Critical factors for assembling a high volume of DNA barcodes, Phil Trans R Soc B 360:1959-1967.
Head, 2015, Library construction for next-generation sequencing: Overviews and challenges, Biotechniques 56(2):61.
Ion Total RNA-Seq Kit v2, User Guide, 2012, Life Technologies (82 pages).
Kalari et al, MAP-Rseq: Mayo analysis pipeline for RNA sequencing, BMC bioinformatics 2014, vol. 15, 224, 13 pages and Supplemental Information.
Karczewki et al., 2014, STORMSeq: an open-source user-friendly pipleline for processing personal genomics data in the cloud.Plos One 9(1):e84860, 5 pages.
Kim et al., 2011, TopHat-Fusion: an algorithm for discovery of novel fusion transcripts, Cancer Discovery, vol. 12:R72, 15 pages.
Lai, 2004, Characterization of the maize endosperm transcriptome and its comparison to the rice genome, Genome Res 14:1932-1937.
Levin, 2010, Comprehensive comparative analysis of strand-specific RNA sequencing methods, Nat Methods 7(9):709-715.
Li, 2014, Bioinformatics pipelines for targeted resequencing and whole-exome sequencing of human and mouse genomes: a virtual appliance approach for instant deployment, Plos One, 9(4):e95217 and Supplemental Information, 11 pages.
Liang, 2014, Copy number variation sequencing for comprehensive diagnosis of chromosome disease syndromes, The Journal of Molecular Diagnostics, 16(5), plus Supplemental Information, 15 pages.
Lindstrom, 2004, Pyrosequencing for detection of Lamivudine-resistant Hepatitis B virus, J Clin Microb 42(10):4788-4795.
Machine translation generated Jun. 18, 2021, of JP 2015511819 A (400 pages).
Mauk, 2018, Simple Approaches to Minimally-Instrumented, Microfluidic-Based Point-of-Care Nucleic Acid Amplification Tests, Biosensors 8(1):e17.
Merriman, 2012, Progress in Ion Torrent semiconductor chip based sequencing, Electrophoresis, 35(23):3397-3417.
Miner, 2004, Molecular barcodes detect redundancy and contamination in hairpin-bisulfite PCR, Nucl Acids Res 32(17):e135, 4 pages.
Mühlberger, 2011, Compputational Analysis Workflows for Omics Data Interpretation, In: Mayer B. (eds) Bioinformatics for Omics Data, Methods in Molecular Biology (Methods and Protocols), vol. 719, pp. 379-397, Chapter 17, Humana Press.
Nugen, 2016, Ovation RNA-Seq User Guide, NuGEN Technologies, Inc., San Carlos, CA (42 pages).
Qiu, 2003, DNA sequence-based "bar-codes" for tracking the origins of expressed sequence tags from a maize cDNA library constructed using multiple mRNA sources, Plant Physiol 133:475-481.
Ronaghi, 2001, Pyrosequencing sheds light on DNA sequencing, Genome Res 11:3-11.
Rothberg, 2011, An integrated semiconductor device enabling non-optical genome sequencing, Nature 475(7356):348-352.
Shapero, 2001, SNP Genotyping by multiplexed solid-phase amplification and fluorescent minisequencing, Genome Res 11:1926-1934.
Shendure, 2005, Accurate multiplex polony sequencing of an evolved bacterial genome, Science 309:1728.
Shiroguchi, 2012, Digital RNA sequencing minimizes sequence dependent bias and amplification noise with optimized single-molecule barcodes, PNAS, 109(4):1347-1352 and Supplemental Information, 22 pages.
Smith, 2010, Highly-multiplexed barcode sequencing: an efficient method for parallel analysis of pooled samples, Nucleic Acids Research, 38(13):e142, 7 pages.
Sood, 2006, Methods for reverse genetic screening in zebrafish by resequencing and Tilling, Methods 39:220-227.
Steffens, 2017, A versatile and low-cost open source pipetting robot for automation of toxicological and ecotoxicological bioassays, PLoS One 12(6):e0179636.
Tewhey, 2009, Micrdroplet-based PCR enrichment for large-scall targeted sequencing, Nat Biotech 27(11):1025-1031.

(56) References Cited

OTHER PUBLICATIONS

The OVATION Ultralow System V2 User guide, part No. 0344, 0344NB, file name M01379_v5_User_Guide_Ovation_Ultralow_Library_Systems_V2_(Part_No._0344)_2215.pdf, available from nugen.com from NuGEN Technologies Inc., San Carlos, CA (30 pages).

Till, 2003, Large-scale discovery of induced point mutations with high-throughput Tilling, Genome Res 13:524-530.

Torri, 2012, Next generation sequence analysis and computational genomics using graphical pipeline workflows, Genes, vol. 3, pp. 545-575.

TRUSEQ Nano DNA Library Prep guide, file name truseq-nano-dna-library-prep-guide-15041110-d.pdf, available from support.illumina.com, Illumina, Inc., San Diego, CA (40 pages).

Tucker, 2009, Massively parallel sequencing: the next big thing in genetic medicine, Am J Human Genet 85:142-154.

Van Dijk, 2014, Library preparation methods for next-generation sequencing: tone down the bias, Exp Cell Res, 322(1):12-20.

\* cited by examiner

SEQUENCE LISTING

<160> NUMBER OF SEQ ID NOS: 1

<210> SEQ ID NO 1
<211> LENGTH: 20
<212> TYPE: DNA
<213> ORGANISM: Artificial Sequence
<220> FEATURE:
<223> OTHER INFORMATION: Synthesis

<400> SEQUENCE: 1
caagcagaag acggcatacg                                                     20

LIBRARY QUANTITATION AND QUALIFICATION

SEQUENCE LISTING

The Sequence Listing associated with this application is provided in text format in lieu of a paper copy, and is hereby incorporated by reference into the specification. The name of the text file containing the Sequence Listing is Sequence_listing.txt. The text file is about 27 KB and is being submitted electronically via EFS-Web.

BACKGROUND

Next Gen DNA sequencers normally use DNA fragments having ends of the known sequence. Having known sequence on both ends enables the DNA fragments to be amplified, immobilized and offers a start position for sequencing (e.g., a priming site). The ends of known sequence are typically referred to as adapters; they adapt the DNA fragment to the needs of the sequencer. Not all DNA fragments in a solution have adapters present on each end for sequence determination. A PCR amplification step using two distinct primers, each specific to one of the adapters, is typically employed to enrich for fragments with two different adapters on their ends. This collection of DNA fragments with adapters on the ends is typically referred to as a library. These libraries may be immobilized on a solid support such that a spatial distance between library elements (e.g., adapters with different DNA fragments inserted between them) allows for visualization (detection) and recognition of single elements from each other.

The distance between elements becomes more critical since the individual elements must be amplified on the surface to increase their number and allow efficient detection of fluorophores as the fragment is being sequenced. This amplification is frequently referred to as bridge amplification and results in what is frequently referred to as a cluster. As the fragment amplifies, a cluster of fragments of the identical sequence is generated on the support.

For the sequence of the DNA in the cluster to be determined, the cluster is homogeneous and does not contain DNA from any other library elements. If clusters are too close together or in the extreme, overlapping, image analysis software may have difficulty distinguishing the boundaries of the clusters and combine them into a single feature for data extraction. Since data from this cluster is derived from two different DNA fragments with two different sequences, the software may not be able to determine the sequences accurately. If clusters are further apart, each cluster can be analyzed separately and the sequence accurately determined. If clusters are too far apart, the sequencing becomes inefficient. The cost of processing a sample is fixed, and the cost per cluster increases.

Since the spacing of the clusters is determined by the concentration of the individual library elements, there is a need to determine the concentration of these library elements accurately.

SUMMARY

Described herein are methods, compositions, and kits for library quantitation and qualification. Some embodiments relate to a method of library quantitation. For example, the method may include providing DNA fragments, amplifying the DNA fragments by polymerase chain reaction (PCR) in the presence of primers each labeled with a fluorophore. In these instances, only a predetermined number of fluorophores are attached to each DNA fragment. The method may further include detecting a fluorescent signal produced by the amplified DNA fragments and calculating a number of the amplified DNA fragments based on the detected fluorescent signal.

In some embodiments, prior to detecting the signal produced by the amplified DNA fragments, the method may further include removing primers that are not incorporated into the amplified DNA fragments or quenching the signal produced by the primers that are not incorporated into the amplified DNA fragments.

In some embodiments, only a single fluorophore is attached to each DNA fragment.

In some embodiments, the method may further include the step of the fluorescence-based sequencing of the amplified DNA fragments.

In some embodiments, the signal produced by the amplified DNA fragments may be detected by detecting the fluorescent signal produced by fluorophores incorporated into the amplified DNA fragments using a fluorometer.

In some embodiments, the method may further include generating a standard curve indicating a relationship between the number of DNA fragments derived from a standard library and fluorescent signals produced by the DNA fragments.

In some embodiments, the number of the amplified DNA fragments may be calculated based on the detected signal by calculating the number of the amplified DNA fragments based on the detected fluorescent signal and the standard curve.

In some embodiments, the method may further include diluting the amplified DNA fragments to a predetermined concentration suitable for the fluorescence-based sequencing.

In some embodiments, the method may further include determining a characteristic of the amplified DNA fragments.

In some embodiments, the characteristic of the amplified DNA fragments may include an average size of the amplified DNA fragment.

In some embodiments, the DNA fragments may include an adapter, and the primers are complementary to the adapter.

Some embodiments relate to a nucleic acid library including DNA fragments each attached with only a predetermined number of fluorophores such that a number of the DNA fragments is calculated based on the fluorescent signal produced by the attached DNA fragments.

In some embodiments, the DNA fragments are PCR amplicons that are generated using primers each labeled with a fluorophore such that with only a predetermined number of fluorophores are attached to each PCR amplicon fragment.

In some embodiments, the DNA fragments may include an adapter, and the primers are complementary to the adapter.

Some embodiments relate to a method of sequencing a DNA sample. For example, the method may include generating DNA fragments using the DNA sample and amplifying the DNA fragments by polymerase chain reaction (PCR) in the presence of primers each labeled with a fluorophore. In these instances, only a predetermined number of fluorophores are attached to each DNA fragment. The method may further include detecting a fluorescent signal produced by the amplified DNA fragments, calculating a number of the amplified DNA fragments based on the detected fluorescent signal, diluting the amplified DNA fragments to a predetermined concentration suitable for the fluorescence-based sequencing, and sequencing at least one portion of the amplified DNA fragments using fluorescence-based sequencing techniques.

In some embodiments, prior to the detecting the signal produced by the amplified DNA fragments, the method may further include removing primers that are not incorporated into the amplified DNA fragments or quenching the signal produced by the primers that are not incorporated into the amplified DNA fragments.

In some embodiments, only a single fluorophore is attached to each DNA fragment.

In some embodiments, the signal produced by the amplified DNA fragments may be detected by detecting the fluorescent signal produced by fluorophores incorporated into the amplified DNA fragments using a fluorometer.

In some embodiments, the method may further include generating a standard curve indicating a relationship between the number of DNA fragments derived from a standard library and fluorescent signals produced by the DNA fragments.

In some embodiments, the number of the amplified DNA fragments based on the detected signal may be calculated by calculating the number of the amplified DNA fragments based on the detected fluorescent signal and the standard curve.

In some embodiments, the method may further include determining a characteristic of the amplified DNA fragments.

In some embodiments, the characteristic of the amplified DNA fragments may include an average size of the amplified DNA fragment.

In some embodiments, the DNA fragments may include an adapter, and the primers are complementary to the adapter.

Some embodiments may further include a kit including adapters capable of linking to DNA fragments and primers complementary to the adapter. Each primer may be labeled with a fluorophore such that the DNA fragments are amplified using the primers to attach each DNA fragment with only a predetermined number of fluorophores.

In some embodiments, the kit may include one or more polymerases.

In some embodiments, the kit may include reagents for amplification.

In some embodiments, the kit may include reagents for sequencing.

In some embodiments, the kit may include written instructions for the use of the kit.

In some embodiments, the I<it may include dATP, dCTP, dGTP, dTTP, or any mixture thereof.

DETAILED DESCRIPTION

Described herein are methods, compositions, and kits for library quantitation and qualification. Embodiments of the present disclosure relate to a surprising discovery that attaching a fluorescent dye to DNA fragments for library quantitation and qualification does not interfere with subsequent sequence determination. In some embodiments, primers attached fluorescent dye are used for library quantitation and qualification. While the primers attached fluorescent dye remain in the library, the subsequent sequencing of the library may be implemented using a fluorescence-based sequencing techniques.

Various methods have been reported for quantitating NGS libraries. Some methods rely on electrophoretic separation of library elements coupled with quantitation of fragments of various lengths (area under the curve assessment). The BioAnalyzer (Agilent Technologies) is commonly used in this approach. In some cases, a scientist might estimate the mass of fragments of a given size and apply a correction factor based on their experience to determine how much to dilute a library to get it in the appropriate range for the sequencer. Others use this information in combination with total nucleic acid mass as determine by UV spectrophotometry to derive a correction factor, again, based on practical experience. Still others use qPCR to more accurately determine the mass of actual library (not total nucleic acid) and use this in combination with fragment sizes from the Bio-Analyzer to get a more accurate determination of the number of cluster forming units and how to appropriately dilute the sample to get the desired concentration for applying to the DNA sequencer.

While these methods can be effective, they rely on learning/judgment, estimations and/or cost and time-consuming qPCR and BioAnalyzer processing. Libraries contain fragments of different length, and length information is critical in determining the number of fragments given a determined mass. Thus, the accuracy of these methods can vary between individuals and libraries. For example, if cluster forming elements are half the size of those estimated, there may be twice the concentration than anticipated. Further, since not all fragments present in a solution have two adapters or two different adapters, these fragments can mask the true cluster forming elements and result in an inaccurate average size estimation.

The present disclosure provides techniques for determining the number of elements capable of generating clusters. Some embodiments of the present disclosure relate to a method for library quantitation and qualification without relying on techniques such as UV spectrophotometry, qPCR, and average fragment size estimation.

In some embodiments, a fluorescent-labeled PCR primer may be employed in the library enrichment step. Since the enrichment step produces amplicons with a single fluorophore or a predetermined number of fluorophores per fragment, the number of molecules may be determined. Each amplification product (e.g., amplicon) may have a predetermined number of fluorophores independent of its length. For example, only those elements which have been amplified have a fluorophore bound. Following PCR enrichment, unincorporated primers are removed, and the amount of fluorescent primer/amplicon is determined fluorometrically. A standard curve may be generated to determine the number of fluorescent fragments in the solution.

Unless otherwise specified, terms and symbols of biochemistry, nucleic acid chemistry, molecular biology and molecular genetics follow those of standard treatises and texts in the field.

As used herein and in the appended claims, the singular forms "a," "an," and "the" include plural referents unless the context clearly dictates otherwise. Thus, for example, reference to "a polymerase" can refer to one agent or to mixtures of such agents, and reference to "the method" includes reference to equivalent steps and/or methods known to those skilled in the art, and so forth.

The term "adaptor," as used herein, can refer to an oligonucleotide of known sequence, the attachment of which to a specific nucleic acid sequence or a target polynucleotide strand of interest enables the generation of amplification ready products of the specific nucleic acid or the target polynucleotide strand of interest. The specific nucleic acid samples can be fragmented or not prior to the addition of at least one adaptor.

Various adaptor designs are envisioned which are suitable for generation of amplification-ready products of specific sequence regions/strands of interest. For example, when double-stranded adaptors are used, the two strands of the adaptor can be self-complementary, noncomplementary or partially complementary. Adaptors can contain at least a partial forward sequence priming site and a random sequence.

As used herein, the terms "amplifying," "amplification" and to "amplify" a specific nucleic acid as used herein, can refer to a procedure wherein multiple copies of the nucleic acid sample of interest are generated, for example, in the form of DNA copies. Many methods and protocols are known in the art to amplify nucleic acids, such as PCR and qPCR.

As used herein, the term "cDNA" as used herein, can refer to complementary DNA. The DNA can be synthesized in a reaction catalyzed by reverse transcriptase and DNA polymerase from a messenger RNA (mRNA) template.

As used herein, the term "complementary" as used herein, can refer to complementarity to all or only to a portion of a sequence. The number of nucleotides in a hybridizable sequence of a specific oligonucleotide primer or probe can be such that stringency conditions used to hybridize the oligonucleotide primer or probe can prevent excessive random non-specific hybridization. The number of nucleotides in the hybridizing portion of the oligonucleotide primer or probe can be at least as great as the defined sequence of the target polynucleotide that the oligonucleotide primer or probe hybridizes to usually about 20 to about 50 nucleotides. The target polynucleotide/oligonucleotide can be larger than the oligonucleotide primer, primers or probe.

As used herein, the term "denaturing" as used herein, can refer to the separation of double-stranded nucleic acid into single strands. Denaturation can be achieved using any of the methods known in the art including, but not limited to, physical, thermal, and/or chemical denaturation.

As used herein, the phrase "genomic DNA" as used herein, can refer to chromosomal DNA, abbreviated as gDNA for genomic deoxyribonucleic acid. gDNA includes the genetic material of an organism.

As used herein, the term "genome" as used herein, can refer to sequences, either DNA, RNA or cDNA derived from a patient, a tissue, an organ, a single cell, a tumor, a specimen of an organic fluid taken from a patient, freely circulating nucleic acid, a fungus, a prokaryotic organism and a virus.

As used herein, the term "transcriptome" can be all RNA sequences that can reflect a partial or entire expressed genome of an organism.

As used herein, the term "kit" can refer to any system for delivering materials. In the context of reaction assays, such delivery systems can include elements allowing the storage, transport, or delivery of reaction components such as oligonucleotides, buffering components, additives, reaction enhancers, enzymes and the like in the appropriate containers from one location to another commonly provided with written instructions for performing the assay. Kits can include one or more enclosures or boxes containing the relevant reaction reagents and supporting materials. The kit can may include two or more separate containers wherein each of those containers includes a portion of the total kit components. The containers can be delivered to the intended recipient together or separately.

As used herein, the phrase "nucleic acid (NA)-modifying enzyme" as used herein, can refer to a DNA-specific modifying enzyme. The NA-modifying enzyme can be selected for specificity for double-stranded DNA. The enzyme can be a duplex specific endonuclease, a blunt-end frequent cutter restriction enzyme, or another restriction enzyme.

As used herein, the phrases "nucleic acid fragment" and "specific nucleic acid" are used interchangeably and as used herein, can refer to a portion of a nucleic acid sample. The nucleic acids in the input sample can be fragmented into a population of fragmented nucleic acid molecules or to polynucleotides of one or more specific size range(s).

As used herein, the phrase "specific nucleic acid sequence" or "specific sequence" as used herein, can be a polynucleotide sequence of interest, for which digital measurement and/or quantitation is desired, including but not limited to a nucleic acid fragment. The specific sequence can be known or not known, in terms of its actual sequence. A "template," as used herein, can be a polynucleotide that contains the specific nucleic acid sequence. The terms "specific sequence, specific nucleic acid sequence, specific nucleotide sequence, regions of interest," or "sequence of interest" and, variations thereof, are used interchangeably.

As used herein, the phrases "qualified nucleic acid" and "qualifies the target nucleic acid fragment" as used herein, can refer to a fragment of a gDNA or RNA sequence that is: i.) an acceptable template for a DNA polymerase, i.e. the template can be free of cross-links or inhibitors to the DNA polymerase, or ii.) the template has a modification including, but not limited to, attachment at the 5' and/or 3' end a polynucleotide sequence at least one of a barcode, an adaptor, a sequence complementary to a primer and so on such that the fragment can be modified for purposes of quantitation, amplification, detection or to other methods known to one of skill in the art of gDNA and cDNA sequence analyses.

As used herein, the term "oligonucleotide" can refer to a polynucleotide chain, typically less than 200 residues long, e.g., between 15 and 100 nucleotides long, but can also encompass longer polynucleotide chains. Oligonucleotides can be single- or double-stranded. As used in this disclosure, the term "oligonucleotide" can be used interchangeably with the terms "primer," "probe" and "adaptor."

As used herein, "PCR" is an abbreviation of term "polymerase chain reaction," a commonly available nucleic acids amplification technology. In some embodiments, PCR employs two oligonucleotide primers for each strand that are designed such as the extension of one primer provides a template for another primer in the next PCR cycle. Either one of a pair of oligonucleotide primers can be named herein as a "forward" or "reverse" primer with the purpose of distinguishing the oligonucleotide primers in the discussion. A PCR can consist of repetition (or cycles) of (i) a denaturation step which separates the strands of a double stranded nucleic acid, followed by (ii) an annealing step, which allows primers to anneal to positions flanking a sequence of interest; and then (iii) an extension step which extends the primers in a 5' to 3' direction thereby forming a nucleic acid fragment complementary to the target sequence. Each of the above steps can be conducted at a different temperature using an automated thermocycler. The PCR cycles can be repeated as often as desired resulting in an exponential accumulation of a target DNA fragment whose termini are usually defined by the 5' ends of the primers used.

The phrase "quantitative PCR" or "qPCR," as used herein, can refer to a PCR designed to measure the abundance of one or more specific target sequences in a sample. Quantitative measurements can be made using one or more reference nucleic acid sequences that can be assayed separately or together with a target nucleic acid.

The term "portion," as used herein, can refer to less than the total length of a nucleic acid sequence, a nucleic acid sequence fragment, a specific nucleic acid sequence, a specific nucleic acid fragment, a probe, a primer and the like.

The term "primer", as used herein, can refer to an oligonucleotide, generally with a free 3' hydroxyl group, that can be capable of hybridizing or annealing with a template (such as a specific polynucleotide, target DNA, target RNA, a primer extension product or a probe extension product) and can also be capable of promoting polymerization of a polynucleotide complementary to the template. A primer can contain a non-hybridizing sequence that constitutes a tail of the primer. A primer can hybridize to a target even though its sequences are not fully complementary to the target.

The primers utilized herein can be oligonucleotides that are employed in an extension reaction by a polymerase along a polynucleotide template, such as in PCR, qPCR, an extension reaction and the like. The oligonucleotide primer can be a synthetic polynucleotide that can be single stranded, containing a sequence at its 3'-end that can be capable of hybridizing with a sequence of the target polynucleotide.

The 3' region of the primer that hybridizes to the specific nucleic acid can may include at least 80%, preferably 90%, more preferably 95%, most preferably 100%, complementarity to a sequence or to a primer binding site.

The term, "sample" as used herein, can refer to any substance containing or presumed to contain a nucleic acid of interest, and thus includes a sample of nucleic acid, cells, organisms, tissue, fluids (e.g., spinal fluid or lymph fluids), organic fluid taken from a patient, and sample including but not limited to blood, plasma, serum, urine, tears, stool, respiratory and genitourinary tracts, saliva, fragments of different organs, tissue, blood cells, circulating tumor cell (CTC) or a disseminated tumor cell (CTD), bone, samples of in vitro cell cultures or specimens that have been suspected to contain nucleic acid molecules.

The term "PCR duplicate," as used herein, can refer to any sequencing read that is derived from the same original nucleic acid molecule and so, the same primer/probe extension product sequence, as another sequencing read and is therefore not representative of a unique nucleic acid molecule.

Additional information related to definitions, processes, methods structures, and other embodiments is provided in U.S. Pat. Pub. No. US20160203259, assigned to Nugen Corp., and incorporated by reference in its entirety.

Embodiments of the present disclosure relate to methods, compositions, and kits for library quantitation and qualification.

Some embodiments relate to a method of library quantitation. In some embodiments, the method may include providing DNA fragments and amplifying the DNA fragments by polymerase chain reaction (PCR) in the presence of primers each labeled with a fluorophore. In these instances, only a predetermined number of fluorophores are attached to each DNA fragment. The method may further include detecting a fluorescent signal produced by the amplified DNA fragments and calculating a number of the amplified DNA fragments based on the detected fluorescent signal.

Some embodiments relate to a method of library quantitation that uses two or more types of primers. Each primer type can have an associated single fluorophore, multiple fluorophores, or completely lack fluorophores. For those embodiments with two types of primers, a first type would have an associated single fluorophore and the second type of primer would lack fluorophores. DNA fragments can be amplified by polymerase chain reaction (PCR) in the presence of at least one primer, with at least one primer labeled with a fluorophore, resulting in a predetermined number of fluorophores being attached to each DNA fragment. A fluorescent signal produced from the amplified DNA fragments is detected, and the number of the amplified DNA fragments based on the detected fluorescent signal is calculated. In some embodiments, the DNA fragments can be further prepared for fluorescent sequencing by diluting the amplified DNA fragments to a predetermined concentration.

In some embodiments, prior to detecting the signal produced by the amplified DNA fragments, the method may further include removing primers that are not incorporated into the amplified DNA fragments or quenching the signal produced by the primers that are not incorporated into the amplified DNA fragments.

In some embodiments, the unincorporated fluorescent PCR primers may be removed prior to making a quantitation measurement. For example, the fluorescence of the primers may be quenched. Following the PCR reaction, the quenching of unincorporated dye may be achieved by annealing a short oligo, which is complimentary to the fluorescent oligo and has a compound attached capable of quenching the fluorophore. When multiple samples are intended to be pooled together prior to sequencing, some embodiments of the present disclosure may enable crude samples to be accurately quantitated, mixed in appropriate proportions, and then purified as a collective rather than individually.

In some embodiments, a separate oligo with a quencher may be used to measure functional elements in a crude mixture is to use an oligo for enrichment that has a hairpin structure and both a fluorophore and quencher. When the oligo is in the hairpin structure, the fluorophore and quencher are in close enough proximity to interfere with fluorescent detection. When the oligo structure is relaxed, and the oligo anneals to the PCR template, the spacing between the fluorophore and quencher is increased such that the fluorophore may be detected. Following PCR, when the solution is cooled, the hairpin reforms in oligos that have not been incorporated. When the measurement is taken, the oligos incorporated into amplicons are detected, but the unincorporated oligos are dark.

In some embodiments, only a single fluorophore is attached to each DNA fragment.

In some embodiments, the method may further include the step of the fluorescence-based sequencing of the amplified DNA fragments.

In some embodiments, the signal produced by the amplified DNA fragments may be detected by detecting the fluorescent signal produced by fluorophores incorporated into the amplified DNA fragments using a fluorometer (alternatively spelled "fluorimeter").

In some embodiments, the method may further include generating a standard curve indicating a relationship between DNA fragments derived from a standard library and fluorescent signals produced by the DNA fragments.

In some embodiments, the number of the amplified DNA fragments may be calculated based on the detected signal by calculating the number of the amplified DNA fragments based on the detected fluorescent signal and the standard curve.

In some embodiments, the method may further include diluting the amplified DNA fragments to a predetermined concentration suitable for the fluorescence-based sequencing.

In some embodiments, the method may further include determining a characteristic of the amplified DNA fragments. For example, following the measurement of the fluorescent primers, a fluorescent intercalating dye may be added to the sample. The fluorescent intercalating dye may bind proportional to the total mass of double-stranded DNA. The absolute mass may then be determined by comparing this fluorescent reading to a standard curve. With accurate numbers of elements and total mass, the average size of the library fragments may be determined. The measurement may provide data associated with the quality of the library and whether the library is made correctly.

In some embodiments, the characteristic of the amplified DNA fragments may include an average size of the amplified DNA fragment.

In some embodiments, the DNA fragments may include an adapter, and the primers are complementary to the adapter.

Some embodiments relate to a nucleic acid library including DNA fragments each attached with only a predetermined number of fluorophores such that a number of the DNA fragments is calculated based on the fluorescent signal produced by the attached DNA fragments.

In some embodiments, the DNA fragments are PCR amplicons that are generated using primers each labeled with a fluorophore such that with only a predetermined number of fluorophores are attached to each PCR amplicon fragment.

In some embodiments, the DNA fragments may include an adapter, and the primers are complementary to the adapter.

Some embodiments relate to a method of sequencing a DNA sample. For example, the method may include generating DNA fragments using the DNA sample and amplifying the DNA fragments by polymerase chain reaction (PCR) in the presence of primers each labeled with a fluorophore. In these instances, only a predetermined number of fluorophores are attached to each DNA fragment. The method may further include detecting a fluorescent signal produced by the amplified DNA fragments, calculating a number of the amplified DNA fragments based on the detected fluorescent signal, diluting the amplified DNA fragments to a predetermined concentration suitable for the fluorescence-based sequencing, and sequencing at least one portion of the amplified DNA fragments using fluorescence-based sequencing techniques.

In some embodiments, prior to the detecting the signal produced by the amplified DNA fragments, the method may further include removing primers that are not incorporated into the amplified DNA fragments or quenching the signal produced by the primers that are not incorporated into the amplified DNA fragments.

In some embodiments, only a single fluorophore is attached to each DNA fragment.

In some embodiments, the signal produced by the amplified DNA fragments may be detected by detecting the fluorescent signal produced by fluorophores incorporated into the amplified DNA fragments using a fluorometer.

In some embodiments, the method may further include generating a standard curve indicating a relationship between DNA fragments derived from a standard library and fluorescent signals produced by the DNA fragments.

In some embodiments, the number of the amplified DNA fragments based on the detected signal may be calculated by calculating the number of the amplified DNA fragments based on the detected fluorescent signal and the standard curve.

In some embodiments, the method may further include determining a characteristic of the amplified DNA fragments.

In some embodiments, the characteristic of the amplified DNA fragments may include an average size of the amplified DNA fragment.

In some embodiments, the DNA fragments may include an adapter, and the primers are complementary to the adapter.

Some embodiments may further include a kit including adapters capable of linking to DNA fragments and primers complementary to the adapter. Each primer may be labeled with a fluorophore such that the DNA fragments are amplified using the primers to attach each DNA fragment with only a predetermined number of fluorophores.

In some embodiments, the kit may include one or more polymerases.

In some embodiments, the kit may include reagents for amplification.

In some embodiments, the kit may include reagents for sequencing.

In some embodiments, the kit may include written instructions for the use of the kit.

In some embodiments, the kit may include dATP, dCTP, dGTP, dTTP, or any mixture thereof.

The present disclosure is further described with reference to the following examples. These examples are provided for purposes of illustration only and are not intended to be limiting unless otherwise specified. Thus, the present disclosure should in no way be construed as being limited to the following examples, but rather, should be construed to encompass any and all variations which become evident as a result of the teaching provided herein.

Example 1

Two Illumina TruSeq DNA libraries (BC11 and BC13) were PCR amplified using a fluorescence-labeled PCR primer (/56-FAM/CAA GCA GAA GAC GGC ATA CG (SEQ ID: 1)). The purified libraries were analyzed on Agilent BioAnalyzer to determine the average size of the library. The libraries were also quantitated by NanoDrop UV-Vis Spectrophotometer and KAPA Library Quantification Kit. The molar concentrations were calculated using quantities determined by KAPA Library Quantification Kit and the library average size determined by BioAnalyzer. Two to eight microliters of the library were mixed with 200 µL of TE buffer, and the fluorescence was read on Qubit 2.0 Fluorometer. The linear correlation of Qubit fluorescence reading and molar quantity was determined.

Two Illumina TruSeq DNA libraries (BC12 and BC14) were PCR amplified using a fluorescence-labeled PCR primer (/56-FAM/CAA GCA GAA GAC GGC ATA CG (SEQ ID: 1)). Five microliters of the library were mixed with 200 µL of TE buffer, and the fluorescence was read on Qubit 2.0 Fluorometer. Library BC13 was used as a standard to calculate the molar concentrations of library BC12 and BC14. An equal molar pool of the four libraries was sequenced on an Illumina MiSeq Sequencer.

Example 2

Six DNA libraries were made by using a fluorescence-labeled PCR primer (/56-FAM/CAA GCA GAA GAC GGC ATA CG (SEQ ID: 1)) in the final PCR amplification. With accurate numbers of elements and total mass, the average size of the library fragments can be determined. Accordingly, the purified libraries were analyzed on Agilent Bio-Analyzer to determine the average size of the library. Two microliters of the library were mixed with either 198 µL of Qubit dsDNA HS Reagent or 198 µL of TE buffer, and the fluorescence was read on Qubit 2.0 Fluorometer. The results were shown in table 1. The correlation of library sizes and the ratios of Qubit readings (DNA dye/Fam) was determined.

TABLE 1

| Library | Average size of library, bp | Qubit reading of library in HS DNA dye | Qubit reading of library Fam label | Ratio of Qubit reading, DNA dye/Fam |
|---|---|---|---|---|
| 1 | 704 | 410 | 2.13 | 192.5 |
| 2 | 468 | 182 | 0.94 | 193.6 |
| 3 | 445 | 323 | 2.7 | 119.6 |
| 4 | 990 | 422 | 1.34 | 314.9 |
| 5 | 644 | 156 | 0.61 | 255.7 |
| 6 | 542 | 362 | 2.35 | 154.0 |

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The invention claimed is:

1. A method of library quantitation, the method comprising:
   providing DNA fragments;
   amplifying the DNA fragments by polymerase chain reaction (PCR) in the presence of at least one primer, with at least one primer labeled with a fluorophore, resulting in a number of amplified labeled DNA fragments each with a predetermined number of fluorophores being attached to each amplified labeled DNA fragment;
   detecting a fluorescent signal produced from the fluorophores attached to the amplified labeled DNA fragments;
   calculating the number of amplified DNA fragments based on the detected fluorescent signal;
   diluting the amplified labeled DNA fragments based on the calculated number of amplified labeled DNA fragments to a predetermined concentration to prepare diluted amplified labeled DNA fragments; and
   sequencing the amplified labeled DNA fragments in clusters using fluorescence-based next generation sequencing.

2. The method of claim 1, further comprising:
   prior to the detecting the signal produced by the amplified labeled DNA fragments, removing primers that are not incorporated into the amplified labeled DNA fragments in preparation for fluorescent sequencing.

3. The method of claim 1, wherein the at least one primer comprises a first primer type and a second primer type, and the first primer type has a single fluorophore attached.

4. The method of claim 1, wherein a single fluorophore is attached to each labeled DNA fragment.

5. The method of claim 2, wherein the detecting the signal produced by the amplified labeled DNA fragments comprises detecting the fluorescent signal produced by fluorophores incorporated into the amplified DNA fragments using a fluorometer.

6. The method of claim 1, further comprising:
   generating a standard curve indicating a relationship between number of DNA fragments derived from a reference sample and fluorescent signals produced by the amplified labeled DNA fragments.

7. The method of claim 6, wherein the calculating the number of the amplified labeled DNA fragments based on the detected signal comprises calculating the number of the amplified labeled DNA fragments based on the detected fluorescent signal and the standard curve.

8. The method of claim 1, further comprising:
   taking a second measurement to determine a characteristic of the amplified labeled DNA fragments.

9. The method of claim 1, further comprising: determining total mass of DNA in a sample.

10. The method of claim 8, wherein the characteristic of the amplified labeled DNA fragments comprises an average size of the amplified labeled DNA fragment derived from the ratio between number of fragments and mass of DNA.

11. The method of claim 1, wherein the DNA fragments comprise at least one adapter, and the primers are complementary to the adapter.

12. The method of claim 1, further comprising:
obtaining a blood or plasma sample from a patient, the sample comprising a nucleic acid of interest; and
obtaining the DNA fragments to be provided from the nucleic acid of interest from the blood or plasma sample from the patient.

13. The method of claim 12, wherein obtaining the DNA fragments comprises fragmenting the nucleic acid of interest from the sample.

14. The method of claim 12, further comprising attaching a barcode and adaptors to the DNA fragments.

15. The method of claim 1, wherein the providing step includes synthesizing complementary DNA (cDNA) from one or more messenger RNA (mRNA) templates.

16. The method of claim 1, wherein the at least one primer labeled with a fluorophore further includes a quencher and the primer has a hairpin structure such that when the primer anneals to a template, spacing between the fluorophore and quencher is increased such that the fluorophore may be detected.

\* \* \* \* \*